Patented Mar. 16, 1948

2,437,866

UNITED STATES PATENT OFFICE 2,437,866

METHOD FOR THE PREPARATION OF 1-CHLORO - 3 - BROMO - 2 - (2-CHLORO-ETHOXY)-PROPANE AND THE COMPOUND PREPARED

Robert M. Vance, Cleveland, Ohio, and Amos G. Horney, Plattsburg, N. Y., assignors to Air Reduction Company, Incorporated, New York, N. Y., a corporation of Delaware No Drawing. Application August 14, 1947, Serial No. 768,702

7 Claims. (Cl. 260—614)

This invention relates to a new chemical compound, 1-chloro-3-bromo - 2 - (2 - chloroethoxy)-propane, and to a method of preparing it.

It is the object of the invention to provide a compound which is useful for various purposes but primarily as an intermediate in the preparation of other compounds, for example the preparation of cyclopropyl vinyl ether, and to afford a method of preparation which is capable of application in relatively large scale commercial operations to produce high yields of the substantially pure compound.

Other objects and advantages of the invention will be apparent as it is better understood by reference to the following specification, in which the preferred embodiments of the invention are described.

The new compound 1-chloro-3-bromo-2-(2-chloroethoxy)-propane has the structural formula

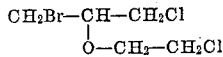

It is a colorless liquid with a characteristic ethereal odor, and has a boiling point of 81–81.5° C. at 1 mm. Other characteristics are $$D\frac{20}{4}=1.577 \text{ and } n\frac{20}{D}=1.5033$$

Preparation of the new compound is best effected by reaction of allyl bromide with ethylene chlorohydrin and chlorine. It is necessary first to prepare allyl bromide by the reaction:

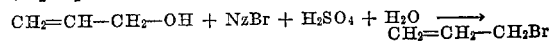

The reaction may be carried out in a five-liter flask fitted with a stirrer, downward condenser and addition funnel. 1350 cc. of water are placed in the flask and 1545 grams (15 mols) of sodium bromide are introduced with stirring. Then 699 grams (12 mols) of allyl alcohol are added, and finally 2000 grams (1087 cc.) of sulfuric acid are fed gradually to the mixture. The flask is then heated and the product distilled with steam. After separation, the product is washed with a dilute aqueous solution of sodium carbonate, dried over calcium chloride and redistilled. The distillate to 70° is allyl bromide suitable for use in the preparation of the new compound. Allyl bromide prepared by any other method may be used.

The new product which is the subject of the present invention is prepared by the reaction:

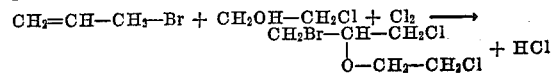

In this reaction 966 grams (12 mols) of ethylene chlorohydrin is placed in a two-liter, three-neck flask, fitted with an addition funnel, addition tube, stirrer, thermometer and HCl exit tube and cooled to 0° C. 940 grams (7.8 mols) of allyl bromide and chlorine, less than the stoichiometric equivalent of the ethylene chlorohydrin, as required are added simultaneously at such a rate that the mixture remains just on the green side while the temperature is held at about 0° C. Upon completion of the reaction, air is introduced to expel the hydrochloric acid and the balance of the latter is removed with heat and vacuum. The product is distilled under reduced pressure to separate the desired product. The yield based on allyl bromide was 29%. Based on ethylene chlorohydrin used the yield was 77%.

As a further illustration of the present invention, 18 mols of allyl bromide and 18 mols of chlorine were gradually added with stirring to 37.5 moles of ethylene chlorohydrin while the reaction mixture was maintained at a temperature of minus 10 to 0° C. The reaction was effected in such a manner that a faint green color was present in the reaction mixture during the addition of the allyl bromide and chlorine. After the completion of the addition of the allyl bromide and chlorine, the reaction mixture was permitted to warm to room temperature, and the hydrogen chloride was removed at reduced pressure, using a water bath. The reaction mixture was then vacuum distilled to yield 6.34 mols (a 35.2% yield, based upon the amount of allyl bromide employed as a reactant) of 1-chloro-3-bromo-2-(2-chloroethoxy) - propane, together with recovered ethylene chlorohydrin and products other than that desired.

As a still further illustration of the method for the preparation of the compound of the present invention, an experiment similar to that described in the previous paragraph was run, except that 2 mols of allyl bromide, 2 mols of chlorine, and 4 mols of ethylene chlorohydrin were employed as reactants and that the reaction was effected at temperatures within the range 45–50° C. This experiment yielded 0.655 mol of 1-chloro-3-bromo-2-(2-chloroethoxy)-propane, a 32.8% yield, based upon the amount of allyl bromide employed as a reactant.

Various modifications may be made in the foregoing teachings to result in the production in good yield of the desired product. Thus, the temperature at which the reaction between the allyl bromide and the ethylene chlorohydrin and chlorine takes place does not appear to be critical, since satisfactory yields of the desired product may be obtained at temperatures as low as minus 10° C. and as high as 50° C., as the foregoing teachings illustrate. Furthermore, the reaction may be effected at even lower or higher temperatures to produce the desired product in good yield. Likewise, the reaction may be effected at atmospheric, sub-atmospheric, or super-atmospheric pressures. For reasons of convenience, however, it is preferred that the reaction be effected at a temperature within the range from about minus 15° C. to about plus 75° C. and at a pressure which is substantially atmospheric.

The procedure as described affords a satisfactory and practicable procedure for the preparation of the desired product which may be carried out with suitable modification of the apparatus used to prepare the product for commercial use.

This application is a continuation-in-part of our application Serial No. 540,318, filed June 14, 1944, entitled "1-chloro-3-bromo-2-(2 - chloroethoxy) propane and method of preparing it."

We claim:

1. A new chemical compound, 1-chloro-3-bromo-2-(2-chloroethoxy) - propane, with the structural formula:

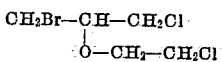

2. The method of preparing 1-chloro-3-bromo-2-(2-chloroethoxy)-propane which comprises reacting allyl bromide with ethylene chlorohydrin and chlorine.

3. The method of preparing 1-chloro-3-bromo-2-(2-chloroethoxy)-propane which comprises reacting allyl bromide with ethylene chlorohydrin and chlorine at a temperature within the range of from about minus 15° C. to about plus 75° C.

4. The method of preparing 1-chloro-3-bromo-2-(2-chloroethoxy)-propane which comprises reacting allyl bromide with ethylene chlorohydrin and chlorine at a temperature within the range of from about minus 15° C. to about plus 75° C. and at a pressure which is substantially atmospheric.

5. The method of preparing 1-chloro-3-bromo-2-(2-chloroethoxy)-propane which comprises reacting allyl bromide with ethylene chlorohydrin and chlorine, the ethylene chlorohydrin being in excess of the stoichiometric equivalent of the allyl bromide, and the chlorine being added to the reaction at such a rate and in such amount as to maintain a green color in the reacting solution.

6. The method of preparing 1-chloro-3-bromo-2-(2-chloroethoxy)-propane which comprises reacting, at a temperature within the range from about minus 15° C. to about plus 75° C., allyl bromide with ethylene chlorohydrin and chlorine, the ethylene chlorohydrin being in excess of the stoichiometric equivalent of the allyl bromide, and the chlorine being added to the reaction at such a rate and in such amount as to maintain a green color in the reacting solution.

7. The method of preparing 1-chloro-3-bromo-2-(2-chloroethoxy)-propane which comprises reacting, at a temperature within the range from about minus 15° C. to about plus 75° C. and at a pressure which is substantially atmospheric, allyl bromide with ethylene chlorohydrin and chlorine, the ethylene chlorohydrin being in excess of the stoichiometric equivalent of the allyl bromide and the chlorine being added to the reaction at such a rate and in such amount as to maintain a green color in the reacting solution.

ROBERT M. VANCE.
AMOS G. HORNEY.